United States Patent
Denis et al.

(10) Patent No.: US 8,967,978 B2
(45) Date of Patent: Mar. 3, 2015

(54) AXIAL RETENTION FOR FASTENERS IN FAN JOINT

(75) Inventors: David Denis, Burlington (CA); Richard Ivakitch, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 466 days.

(21) Appl. No.: 13/558,875

(22) Filed: Jul. 26, 2012

(65) Prior Publication Data

US 2014/0026591 A1 Jan. 30, 2014

(51) Int. Cl.

| | |
|---|---|
| F01D 5/02 | (2006.01) |
| F01D 5/00 | (2006.01) |
| F01D 5/30 | (2006.01) |
| F02C 7/36 | (2006.01) |
| F02C 7/20 | (2006.01) |

(52) U.S. Cl.
USPC ................ 416/244 A; 29/889.21; 60/796

(58) Field of Classification Search
CPC .............................. F01D 5/025; F01D 5/066
USPC ........ 60/796, 222.1, 22.16; 29/889.2, 889.21, 29/889.22; 416/175, 244 R, 244 A; 403/335, 337; 415/216.1
See application file for complete search history.

(56) References Cited

U.S. PATENT DOCUMENTS

| | | | |
|---|---|---|---|
| 1,816,704 A | 7/1931 | Thornburgh | |
| 3,018,685 A | 1/1962 | Squire | |
| 3,036,487 A | 5/1962 | Hughes | |
| 3,438,664 A | 4/1969 | Meyer | |
| 4,190,397 A * | 2/1980 | Schilling et al. | 415/112 |
| 4,634,132 A | 1/1987 | Jelinek | |
| 4,659,246 A | 4/1987 | Sugiyama | |
| 4,723,889 A * | 2/1988 | Charreron et al. | 416/193 A |
| 4,817,794 A | 4/1989 | Workman | |
| 4,887,949 A * | 12/1989 | Dimmick et al. | 411/121 |
| 5,052,891 A * | 10/1991 | Burkholder | 416/198 A |
| 5,072,917 A | 12/1991 | Pleva | |
| 5,211,541 A * | 5/1993 | Fledderjohn et al. | 416/198 A |
| 5,226,788 A * | 7/1993 | Fledderjohn | 415/177 |
| 5,501,575 A * | 3/1996 | Eldredge et al. | 416/144 |
| 5,540,552 A * | 7/1996 | Surdi | 416/220 R |
| 5,558,393 A | 9/1996 | Hawkins et al. | |
| 5,639,074 A | 6/1997 | Greenhill et al. | |
| 6,006,628 A | 12/1999 | Heidorn | |
| 6,068,250 A | 5/2000 | Hawkins et al. | |
| 6,322,306 B1 * | 11/2001 | Dutton | 411/121 |
| 6,641,326 B2 * | 11/2003 | Schilling et al. | 403/337 |
| 6,669,184 B2 | 12/2003 | Cai et al. | |
| 6,883,303 B1 * | 4/2005 | Seda | 60/226.1 |
| 7,674,080 B2 * | 3/2010 | Agg et al. | 411/92 |
| 7,938,607 B2 | 5/2011 | Wang | |
| 8,459,941 B2 * | 6/2013 | Jasko et al. | 415/190 |
| 8,678,772 B2 * | 3/2014 | Dieling | 416/245 R |
| 2007/0212192 A1 * | 9/2007 | Shirk et al. | 411/166 |
| 2010/0303584 A1 | 12/2010 | Van Der Veen et al. | |
| 2013/0183118 A1 * | 7/2013 | Cooper | 411/337 |

* cited by examiner

*Primary Examiner* — Andrew Nguyen
*Assistant Examiner* — Jason H Duger
(74) *Attorney, Agent, or Firm* — Norton Rose Fulbright Canada LLP

(57) ABSTRACT

In a gas turbine engine, a fan rotor and a compressor rotor are connected to a joint which is attached to a shaft. The fan rotor is connected to the joint by a plurality of fasteners extending through mounting openings in the joint and through apertures in the fan rotor. A standard retaining ring is attached to the joint to cover a portion of an enlarged head of each of the respective fasteners in order to prevent removal of the respective fasteners from the mounting openings in the joint before the respective fasteners are connected to the fan rotor.

12 Claims, 2 Drawing Sheets

AXIAL RETENTION FOR FASTENERS IN FAN JOINT

TECHNICAL FIELD

The application relates generally to aircraft gas turbine engines and, more particularly, to axial retention for fasteners in fan joints for such engines.

BACKGROUND OF THE ART

Aircraft gas turbofan engines generally include a low pressure spool assembly having a fan rotor, low pressure compressor and a low pressure turbine connected by a low pressure spool shaft, and a high pressure spool assembly having a high pressure compressor and a high pressure turbine connected by a hollow high pressure spool shaft disposed coaxially around the low pressure spool shaft. Conventionally, the fan rotor and the low pressure compressor, particularly a boost stage positioned upstream of the low pressure compressor, are tied together by a fan and boost joint attached to an upstream end of the low pressure spool shaft. Both the fan rotor and boost rotor are connected to the joint by two groups of circumferentially spaced fasteners, respectively. It is a challenging task to install the fan rotor and boost rotor to the joint which is attached to the upstream end of the low pressure spool shaft with a bearing assembly positioned in this area to support the upstream end of the low pressure spool shaft. Limited space in this area and the significant weight of the fan rotor which results in inertia of the fan rotor during installation, conventionally require special retaining features of individual fasteners to remain in position during fan rotor installation. The use of fasteners having special retaining features increases manufacturing costs.

Accordingly there is a need to provide an improved apparatus and method for installation of a fan rotor and a compressor rotor to a joint in aircraft gas turbine engines.

SUMMARY

In one aspect, there is provided a gas turbine engine having at least one spool assembly, the at least one spool assembly comprising a fan rotor, a compressor rotor disposed downstream of the fan rotor, a turbine and a shaft connecting the fan rotor, compressor rotor and turbine, a joint attached to an upstream end of the shaft and having an annular web extending radially outwardly from the shaft, the compressor rotor being connected to an annular peripheral region of the joint, the fan rotor being connected to an upstream side of the web of the joint by a plurality of circumferentially spaced fasteners axially extending through respective mounting openings in the web and respective mounting apertures in the fan rotor, and a standard retaining ring being attached to a downstream side of the web to cover a portion of an enlarged head of each of the respective fasteners to prevent removal of the respective fasteners from the mounting openings in the web of the joint before the respective fasteners are connected to the fan rotor In another aspect, there is provided method for assembling a fan rotor and a compressor rotor to a rotatable shaft of a gas turbine engine using a joint attached to an upstream end of the shaft, the joint having an annular web extending radially and outwardly from the shaft, the joint including a plurality of circumferentially spaced mounting openings extending through the annular web and positioned radially inward of an annular peripheral region of the joint, the method comprising: a) sliding a plurality of fasteners through the respective mounting openings in a direction from a downstream side of the web to an upstream side of the web; b) attaching a standard retaining ring to the joint to restrain an enlarged head of each fastener between the downstream side of the web and the standard retaining ring, thereby retaining each fastener in one of the mounting openings with a portion of each fastener axially projecting from the upstream side of the web; c) connecting the compressor rotor to the annular peripheral region of the joint; d) placing the fan rotor in position to allow the projecting portion of each fastener to extend through a respective mounting aperture in the fan rotor; and e) securing the respective fasteners in position with respect to the fan rotor to securely connect the fan rotor to the annular web of the joint.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
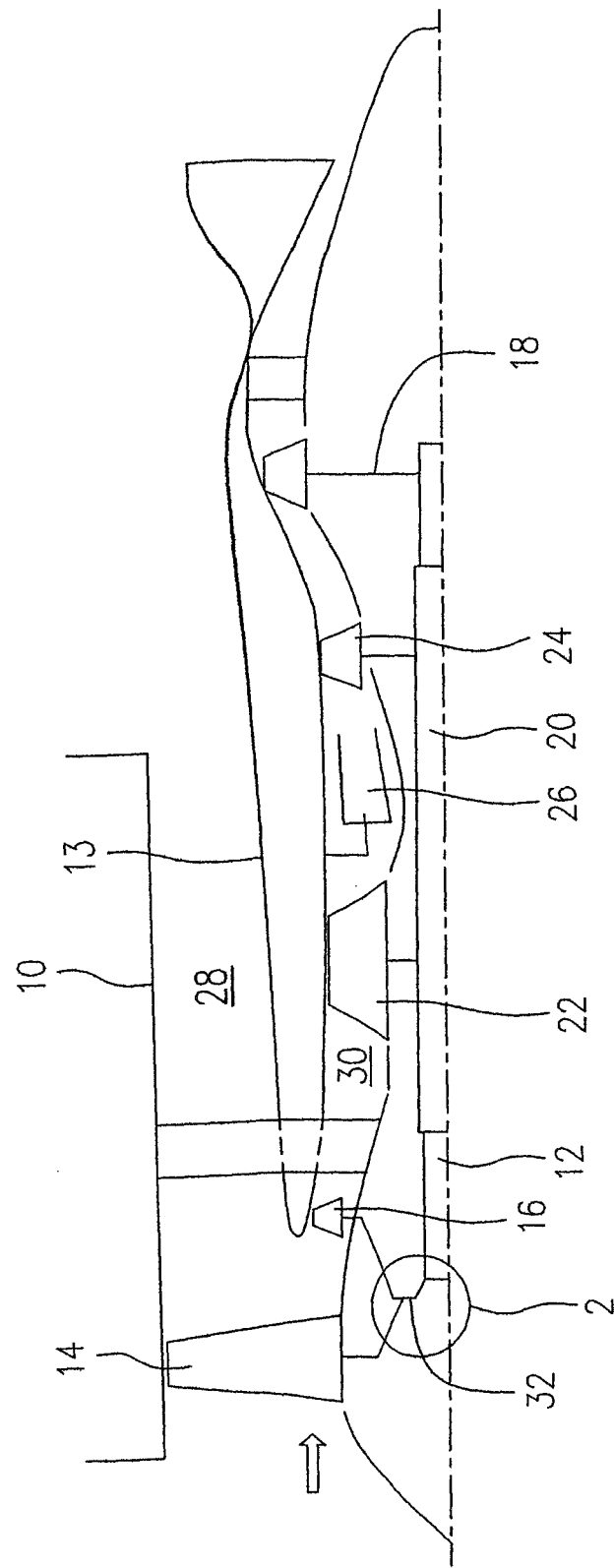
FIG. 1 is a schematic side cross-sectional view of a gas turbine engine.

FIG. 1 illustrates a turbofan gas turbine engine according to one embodiment. The engine includes a housing or nacelle 10, a core casing 13, a low pressure spool assembly (not numbered) which includes a fan rotor 14 a low pressure compressor assembly having a boost compressor rotor 16 and a low pressure turbine assembly 18 connected by a shaft 12, and a high pressure spool assembly (not numbered) which includes a high pressure compressor assembly 22 and a high pressure turbine assembly 24 connected by a turbine shaft 20. The housing or nacelle 10 surrounds the core casing 13 and in combination the housing 10 and the core casing 13 define an annular bypass duct 28 for directing a bypass airflow. The core casing 13 surrounds the low and high pressure spool assemblies to define a core fluid path 30 therethrough. In the core fluid path 30 there is provided a combustor 26 to form a combustion gas generator assembly which generates combustion gases to power the high pressure turbine assembly 24 and the low pressure turbine assembly 18. The boost compressor rotor 16 is disposed downstream of the fan rotor 14 and together with the fan rotor 14 is connected to the shaft 12 by a joint 32, as schematically shown in the circled area 2 and which will be further described hereafter.

The terms "upstream" and "downstream" mentioned in the description below, generally refer to the airflow direction through the engine and are indicated by an arrow in FIG. 1. The terms "axial", "radial" and "circumferential" used for various components below are defined with respect to the main engine axis shown but not numbered in FIG. 1.

Figure 2:
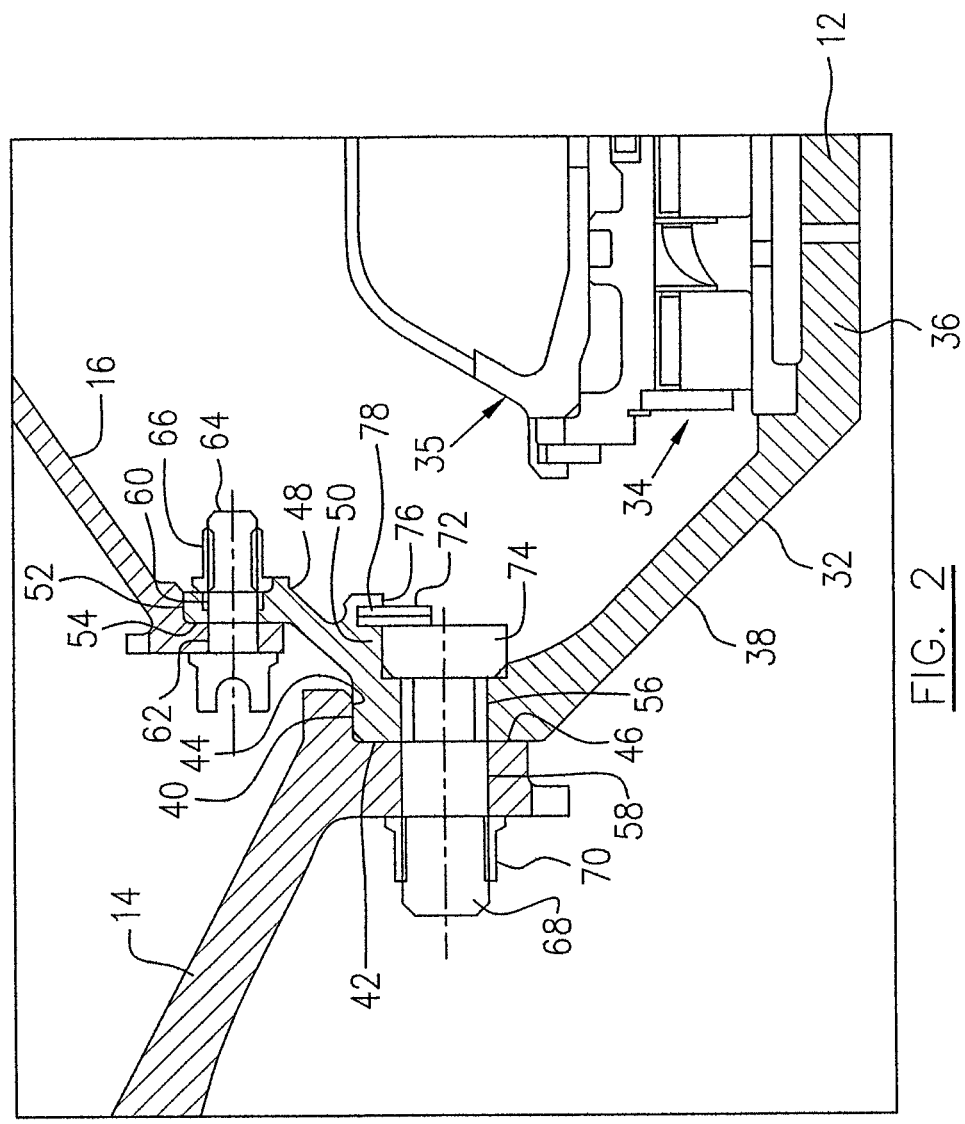
FIG. 2 is a partial cross-sectional view of the circled area 2 in FIG. 1 in an enlarged scale, showing a structural arrangement of one embodiment.

According to one embodiment illustrated in FIGS. 1 and 2, the shaft 12 is supported by a bearing assembly 34 disposed around the shaft 12 adjacent to an upstream end 36 of the shaft 12. The bearing assembly 34 is supported by a stationary structure 35 of the engine. The joint 32 may be removably attached to the upstream end 36 of the shaft 12, for example by a spline and a spigot arrangement, or may be non-removably attached (integrated) to the upstream end 36 of the shaft 12.

The joint 32 according to this embodiment, may have an annular web 38 extending radially outwardly from the upstream end 36 of the shaft 12. The annular web 38 may have an annular periphery providing an annular axial surface 40. An annular radial mounting surface 42 may be provide on the upstream side of the annular web 38, extending substantially radially outwardly and terminating at the annular axial surface 40. The annular axial surface 40 and the annular radial mounting surface 42 may contact respective annular axial and radial surfaces 44, 46 of the fan rotor 14 when the fan rotor 14 is connected to the joint 32.

The joint 32 may further include an annular peripheral region 48 integrated with the web 38 and extending radially outwardly from the annular periphery of the web 38. According to this embodiment, the annular web 38 may further include an annular area 50 thickened in an axial dimension of the web 38, positioned adjacent the annular periphery of the web 38 and forming an annular projection on the downstream side of the annular web 38, located radially inward of the annular peripheral region 48 of the joint 32. The peripheral region 48 of the joint 32 may provide an annular axial surface 52 and an annular radial mounting surface 54 on the upstream side of the peripheral region 48, extending radially and outwardly and terminating at the annular axial surface 52. According to this embodiment, the annular radial mounting surface 54 may be axially offset from the annular radial mounting surface 42, for example in an axial location downstream of the location of the annular radial mounting surface 42. The annular axial surface 52 and the annular radial mounting surface 54 of the peripheral region 48 of the joint 32 may abut respective annular axial surface and annular radial surface (not numbered) of the boost compressor rotor 16 when the boost compressor rotor 16 is connected to the joint 32.

A plurality of openings 60 may extend axially through the annular peripheral region 48, circumferentially spaced apart one from another. The openings 60 may be radially and circumferentially aligned with respective apertures 62 defined through the boost compressor rotor 16, to allow respective standard fasteners 64 (for example standard bolts) to extend axially through the aligned respective apertures 62 and openings 60 to connect the boost compressor rotor 16 with the joint 32. Each standard fastener 64 may be secured in position for example by a lock nut 66. The enlarged head (not numbered) of the respective standard fastener 64 may be positioned at the upstream side of the boost compressor rotor 16 or at the downstream side of the annular peripheral region 48 of the joint 32.

A plurality of mounting openings 56 which are circumferentially spaced apart one from another, may extend axially through the annular web 38 adjacent and radially inward of the annular thickened area 50. The mounting openings 56 may be radially and circumferentially aligned with respective apertures 58 defined through the fan rotor 14, for example with a radial mounting flange (not numbered) of the fan rotor 14, to allow respective standard fasteners 68 (for example standard bolts) to extend axially through the aligned mounting openings 56 and apertures 58 to connect the fan rotor 14 with the joint 32. Each standard fastener 68 may be secured in position for example by a lock nut 70. A portion of a stem (not numbered) of each standard fastener 68 may project axially from a radial mounting flange (not numbered) of the fan rotor 14 to engage with the corresponding lock nut 70.

One or more standard retaining rings 72 may be attached to a downstream side of the web 38 to cover a portion of an enlarged head 74 of each of the respective standard fasteners 68 in order to prevent removal of the respective fasteners 68 from the mounting openings 56 in the web 38 during the fan rotor installation procedure, which will be further described hereinafter.

According to one embodiment, the annular thickened area 50 may define a radially inward facing surface 76 and an annular groove 78 extending radially inward from the radially inward facing surface 76 into the thickened area 50. The mounting openings 56 defined in the annular web 38 may be configured such that the standard fasteners 68 received in the respective mounting openings 56 are positioned at a substantially equal distance, radially inward from the annular outer edge of the annular peripheral region 48 of the joint 32. In this embodiment, such an outer peripheral edge is the annular axial surface 52 of the peripheral region 48 of the joint 32. Therefore, the standard retaining ring or rings 72 when received in the annular groove 78 are enabled to partially cover the enlarged head 74 of each standard fastener 68 such that the enlarged head 74 of each standard fastener 68 is axially restrained between the downstream side of the annular web 38 and the annular standard retaining ring(s) 72. The respective standard fasteners 68 are thereby retained in the respective mounting openings 56 of the web 38 of the joint 32 regardless of being secured to the fan rotor 14 by the respective lock nuts 70.

According to one embodiment, a fan rotor and compressor rotor installation procedure may begin with a step of sliding the standard fasteners 68 through the respective mounting openings 56 defined in the web 38 of the joint 32, in a direction from the downstream side of the web 38 to an upstream side of the web 38, as illustrated in FIG. 2. The standard retaining ring 72 may be elastically forced into the annular groove 78 defined in the web 38 to restrain the enlarged head 74 of each standard fastener 68 between the downstream side of the web 38 and the standard retaining ring 72, thereby retaining each standard fastener 68 in one of the mounting openings 56 with a portion of each standard fastener 68 axially projecting from the upstream side of the web 38.

After the standard fasteners 68 are received within and retained by the standard retaining ring 72 in the respective mounting openings 56 of the web 78 of the joint 72, the boost compressor rotor 16 may be connected to the annular peripheral region 48 of the joint 32, for example by aligning the openings 54 and the apertures 62 and inserting the standard fasteners 64 through the respective aligned openings 60 and apertures 62 and securing the standard fasteners 64 in position with respective lock nuts 66.

After the boost compressor rotor 16 is connected to the shaft 12 by the joint 32, the fan rotor 14 may be placed in position upstream of the boost compressor rotor 16 to allow the projecting portion of each standard fastener 68 to extend through a respective mounting aperture 58 in the radial mounting flange of the fan rotor 14. The last step of the procedure is to secure the respective standard fasteners 68 in position with respect to the fan rotor 14, for example by using the respective lock nuts 70 to securely connect the fan rotor 14 to the annular web 38 of the joint 32. Therefore, the fan rotor 14 and the boost rotor 16 are now installed on the shaft 12 by means of the annular joint 32.

The fan rotor is relatively heavy, for example weighing in excess of 200 pounds and may cause significant inertia thereof when the fan rotor 14 is being moved towards the joint 32 during installation. The standard retaining ring 72 should have a load bearing capacity for the inertia of the fan rotor created during the installation. Alternatively, two or more substantially identical standard retaining rings 72 may be coaxially positioned one in contact with another to be snugly received in the annular groove 78, as illustrated in FIG. 2 in order to increase a stiffness of the retaining rings 72, thereby ensuring that the annular retaining ring(s) 72 cannot be elastically or plastically deformed to allow a standard fastener 68 to be knocked out of the mounting opening 56 by the inertia of the fan rotor 14 during installation. It would be very difficult to access a knocked-out fastener 68 and reposition it into the mounting opening 56 in the web 38 of the joint 32 because the boost compressor rotor 16 would already be installed to the joint 32.

The embodiments advantageously provide a method and apparatus for installing the fan rotor and a compressor rotor (which may or may not be a boost compressor rotor) to the engine shaft 12, using standard fasteners and retaining rings, thereby eliminating the need for non-standard fasteners with individual retaining features.

The above description is meant to be exemplary only, and one skilled in the art will recognize that changes may be made to the embodiments described without departing from the scope of the described subject matter. For example, the details of the annular joint 32 may be configured differently from those of the embodiment illustrated in the drawings. The annular thickened area 50 with the annular groove 78 defined therein may be positioned radially inward of the circumferentially spaced mounting openings 56 such that a radially inward annular portion of the one or more standard retaining rings 72 may be received in the annular groove 78 and the radially outward annular portion of the one or more standard retaining rings 72 may cover a portion of the respective enlarged heads 74 of the standard fasteners 68, in a manner different from the configuration illustrated in FIG. 2. Modifications which fall within the scope of the above-described subject matter will be apparent to those skilled in the art, in light of a review of this disclosure, and such modifications are intended to fall within the appended claims.

The invention claimed is:

1. A gas turbine engine having at least one spool assembly, the at least one spool assembly comprising a fan rotor, a compressor rotor disposed downstream of the fan rotor, a turbine and a shaft connecting the fan rotor, compressor rotor and turbine, a joint attached to an upstream end of the shaft and having an annular web extending radially outwardly from the shaft, the compressor rotor being connected to an annular peripheral region of the joint, the fan rotor being connected to an upstream side of the web of the joint by a plurality of circumferentially spaced fasteners axially extending in sequence through respective mounting openings in the web and respective mounting apertures in the fan rotor, and a standard retaining ring being attached to a downstream side of the web, the standard retaining ring being placed against a portion of an enlarged head of each of the respective fasteners and in a location of blocking withdrawal of the respective fasteners from the mounting openings in the web of the joint before the respective fasteners are connected to the fan rotor.

2. The gas turbine engine as defined in claim 1 wherein the web of the joint comprises an annular area thickened in an axial dimension of the web, an annular groove being defined in the thickened area, the annular groove receiving an annular portion of the standard retaining ring.

3. The gas turbine engine as defined in claim 2 wherein the annular thickened area is located radially inward of the annular peripheral region of the joint.

4. The gas turbine engine as defined in claim 2 wherein the annular thickened area is located radially outward of the respective mounting openings in the web.

5. The gas turbine engine as defined in claim 2 wherein the thickened area comprises a radially inner facing surface and the annular groove extends radially outward through the radially inner facing surface and into the thickened area.

6. The gas turbine engine as defined in claim 1 wherein each of the fasteners are positioned at a substantially equal distance, radially inward from an annular edge of the annular peripheral region of the joint.

7. The gas turbine engine as defined in claim 1 wherein a portion of a stem of each of the fasteners projects axially from the fan rotor, engaging with a securing device which is placed against the fan rotor.

8. The gas turbine engine as defined in claim 1 further comprising at least one additional standard retaining ring substantially identical to said standard retaining ring, said standard retaining ring and the at least one additional standard retaining ring being co-axially positioned one in contact with another, thereby increasing a stiffness thereof.

9. A method for assembling a fan rotor and a compressor rotor to a rotatable shaft of a gas turbine engine using a joint attached to an upstream end of the shaft, the joint having an annular web extending radially and outwardly from the shaft, the joint including a plurality of circumferentially spaced mounting openings extending through the web and positioned radially inward of an annular peripheral region of the joint, the method comprising:
  a) sliding a plurality of fasteners through the respective mounting openings in a direction from a downstream side of the web to an upstream side of the web;
  b) attaching a standard retaining ring to the joint to restrain an enlarged head of each of the fasteners between the downstream side of the web and the standard retaining ring, the standard retaining ring being placed against a portion of the enlarged head of each of the fasteners, thereby retaining each of the fasteners in one of the mounting openings with a portion of each of the fasteners axially projecting from the upstream side of the web;
  c) connecting the compressor rotor to the annular peripheral region of the joint;
  d) placing the fan rotor in position to allow the projecting portion of each of the fasteners to extend through a respective mounting aperture in the fan rotor; and
  e) securing the respective fasteners in position with respect to the fan rotor to securely connect the fan rotor to the web of the joint.

10. The method as defined in claim 9 wherein in step (b) said standard retaining ring is replaced with two or more substantially identical standard retaining rings co-axially positioned one in contact with another to increase a stiffness thereof.

11. The method as defined in claim 9 wherein in step (b) the attachment of the standard retaining ring to the joint is performed by placing an annular portion of the standard retaining ring into an annular groove defined in the joint, the annular groove in the joint being adjacent to the respective mounting openings in the web of the joint.

12. The method as defined in claim 9 wherein in step (c) the connection of the compressor rotor to the annular peripheral region of the joint is performed with a plurality of connectors extending axially through respective openings defined in the annular peripheral region of the joint and respective apertures defined in the compressor rotor.

* * * * *